(12) United States Patent
Doerr et al.

(10) Patent No.: US 8,179,792 B1
(45) Date of Patent: May 15, 2012

(54) PACKET DE-DUPLICATION

(75) Inventors: Raymond Robert Doerr, Gardner, KS (US); Matthew Allen Brandes, Ottawa, KS (US); Jeremy R. Breau, Kansas City, MO (US); Gary Joel Rieschick, Louisburg, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 372 days.

(21) Appl. No.: 12/134,341

(22) Filed: Jun. 6, 2008

(51) Int. Cl.
*G01R 31/08* (2006.01)
*H04J 21/16* (2006.01)

(52) U.S. Cl. ........ 370/230; 370/389; 370/392; 370/474; 370/229; 370/252; 370/256

(58) Field of Classification Search .................. 370/230, 370/389, 392, 474, 229, 252, 256
See application file for complete search history.

(56) References Cited

U.S. PATENT DOCUMENTS

| 4,736,465 A * | 4/1988 | Bobey et al. ............... 398/66 |
| 6,615,221 B2 | 9/2003 | Warner et al. |
| 7,177,930 B1 | 2/2007 | LoPresti |
| 7,299,277 B1 | 11/2007 | Moran et al. |
| 2005/0018668 A1 * | 1/2005 | Cheriton .................. 370/389 |
| 2005/0117610 A1 * | 6/2005 | Chevallier et al. ........... 370/521 |

FOREIGN PATENT DOCUMENTS

| EP | 1665671 | 2/2005 |
| WO | 2005011213 | 2/2005 |

OTHER PUBLICATIONS

Vi Di Leo Gremmelspacher, "Development of a Distributed Network Block Device for Unicast Networks," Bachelor Thesis, Jun. 2007, 50 pages, Albert-Ludwigs-University Freiburg, Germany.
Kristoffer Martinsson, "Design of Application Specific Microcontroller," Nov. 28, 2002, 103 pages, Department of Electrical Engineering, Linköping University, Linköping, Sweden.

* cited by examiner

*Primary Examiner* — Kwang B Yao
*Assistant Examiner* — Jamal Javaid

(57) ABSTRACT

From a packet stream, a first packet, one or more intervening packets, and a second packet are received in the preceding order. The first packet is inserted into a buffer. The one or more intervening packets are inserted into the buffer after the first packet. At least a portion of the first packet is compared to at least a portion of the second packet to produce a comparison result. The second packet is inserted into the buffer after the one or more intervening packets if the comparison result indicates that the second packet is not a duplicate of the first packet.

6 Claims, 5 Drawing Sheets

```
┌─────────────────────────────────────────────┐
│ RECEIVE, IN ORDER, A FIRST PACKET, ONE OR MORE │
│ INTERVENING PACKETS, AND A SECOND PACKET    │
│                    202                      │
└─────────────────────────────────────────────┘
                      │
┌─────────────────────────────────────────────┐
│       INSERT THE FIRST PACKET INTO A BUFFER │
│                    204                      │
└─────────────────────────────────────────────┘
                      │
┌─────────────────────────────────────────────┐
│   INSERT THE ONE OR MORE INTERVENING PACKETS │
│      INTO THE BUFFER AFTER THE FIRST PACKET │
│                    206                      │
└─────────────────────────────────────────────┘
                      │
┌─────────────────────────────────────────────┐
│   COMPARE A PORTION OF THE FIRST PACKET TO A │
│         PORTION OF THE SECOND PACKET        │
│                    208                      │
└─────────────────────────────────────────────┘
                      │
┌─────────────────────────────────────────────┐
│     INSERT THE SECOND PACKET INTO THE BUFFER │
│  AFTER THE ONE OR MORE INTERVENING PACKETS IF │
│   THE SECOND PACKET IS NOT A DUPLICATE OF THE │
│                 FIRST PACKET                │
│                    210                      │
└─────────────────────────────────────────────┘
```

FIGURE 2

PACKET DE-DUPLICATION

TECHNICAL BACKGROUND

Modern digital data networks are carrying increasing amounts of traffic to an increasing number of destinations. To adjust to these changes, the organization of the networks of businesses and network providers are constantly being changed and adapted. These changes may occur to both the network hardware and software. To facilitate the software organization of a network, virtual local area network's (VLANs) may be utilized.

A VLAN, is a group of hosts with a common set of requirements that communicate as if they were attached to the same wire. This is achieved regardless of the actual physical location of each of the hosts. A VLAN has many of the same attributes as a physical local area network (LAN), but it allows end stations to be grouped together even if they are not located on the same LAN segment. Thus, network reconfiguration may be done through software instead of physically relocating devices.

Because VLANs simulate the physical connection of hosts, VLANs can provide segmentation services traditionally provided by routers in LAN configurations. This allows VLANs to address issues such as scalability, security, and network management.

Overview

A method of removing duplicate packets from a packet stream is disclosed. From a packet stream, a first packet, one or more intervening packets, and a second packet are received in the preceding order. The first packet is inserted into a buffer. The one or more intervening packets are inserted into the buffer after the first packet. At least a portion of the first packet is compared to at least a portion of the second packet to produce a comparison result. The second packet is inserted into the buffer after the one or more intervening packets if the comparison result indicates that the second packet is not a duplicate of the first packet.

A system for removing duplicate packets from a packet stream is disclosed. A buffer receives packets from the packet stream. Buffer insertion logic inserts a first packet from the packet stream into the buffer if the first packet is not a duplicate of a second packet already stored in the buffer. The first packet and the second packet are not received from the packet stream consecutively.

A method of operating a communication system is disclosed. A plurality of packets traversing a plurality of network switch ports is mirrored to produce a mirrored packet stream. The mirrored packet stream comprises at least a first packet, one or more intervening packets, and a second packet, in that order. The first packet is inserted into a buffer. The one or more intervening packets are inserted into the buffer. At least a portion of the first packet is compared to at least a portion of the second packet to produce a comparison result. The second packet is inserted into the buffer after the intervening packets if the comparison result indicates that the second packet is not a duplicate of the first packet.

BRIEF DESCRIPTION OF THE DRAWINGS

FIG. 2 is a flowchart illustrating a method of removing duplicate packets from a packet stream.

DETAILED DESCRIPTION

Figure 1:
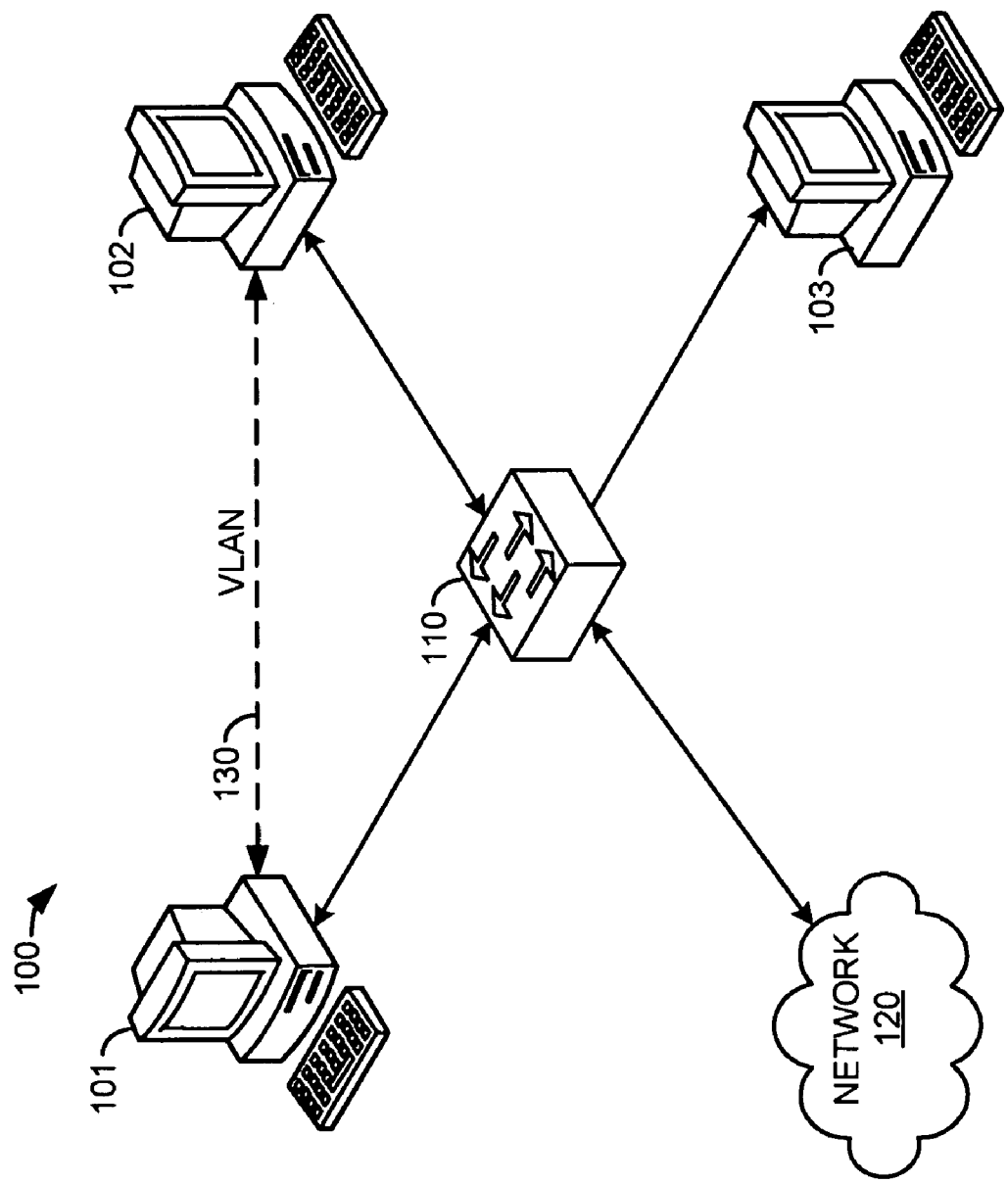
FIG. 1 is a block diagram illustrating a communication system.

FIG. 1 is a block diagram illustrating a communication system. In FIG. 1, communication system 100 comprises: computer system 101; computer system 102; computer system 103; switch 110; and network 120. Computer system 101 is operatively coupled to switch 110. Computer system 102 is operatively coupled to switch 110. Computer system 103 is operatively coupled to switch 110. Network 120 is operatively coupled to switch 110.

Network 120 could be any network or collection of networks that couple, link, or otherwise operatively connect computer system 101 and computer system 102 with other computer systems or networks via switch 110. In addition, other secondary data networks could be used. In an example, communication network 120 may include a backhaul network, a local network, a long distance network, a packet network, or any combination thereof, as well as other types of networks.

Switch 110 may be configured to create VLAN 130 that allows computer system 101 and computer system 102 to communicate as if they were on the same physical wire. Thus, computer system 101 and computer system 102 may be operatively coupled via VLAN 130 as configured by switch 110.

Switch 110 may be configured to exchange traffic to or from VLAN 130 with network 120. Switch 110 may be configured to send a copy of the traffic on VLAN 130 to computer system 103. When switch 110 is configured to send a copy of the packet stream on one or more ports of switch 110 to computer system 103, it may be referred to as "port minoring." The packet stream sent to computer system 103 may be referred to as a "mirrored" packet stream. When switch 110 is configured to minor packets or a packet stream, computer system 103 may be used to monitor or diagnose problems with communication system 100.

When switch 110 is configured to send the traffic on VLAN 130 to computer system 103, switch 110 may send non-adjacent duplicate packets to computer system 103. For example, a first packet may arrive at switch 110 from computer system 101 that is destined for computer system 102. This packet may be sent by switch 110 to computer system 103. Before switch 110 sends this first packet to computer system 102, switch 110 may send a second packet received from network 120 and destined for VLAN 130 to computer system 103. Switch 110 may then send the first packet to computer system 102. Switch 110 may also send the first packet to computer system 103 because the switch 110 is configured to send both incoming and outgoing traffic from VLAN 130 to computer system 103.

Computer system 103 or switch 110 may be configured to eliminate non-adjacent duplicate packets. For example, computer system 103 or switch 110 may contain a buffer and buffer insertion logic. The buffer may be a circular buffer.

The buffer insertion logic may receive a first packet. The buffer insertion logic may then insert this first packet into the buffer. The buffer insertion logic may then receive and insert one or more intervening packets in the buffer. The buffer insertion logic may then receive a second packet. The buffer insertion logic may then compare at least a portion of the second packet to the packets in the buffer. If the second packet is not a duplicate of a packet in the buffer, the buffer insertion logic may then insert the second packet into the buffer. The buffer and buffer insertion logic may comprise or operate as a content addressable memory. The buffer insertion logic may compare at least a portion of the second packet to at least a portion of one or more packets in the buffer in response to a result of a query of a content addressable memory.

Buffer insertion logic may process the first, second, and intervening packets as part of determining if these packets are a duplicate of a packet in the buffer. For example, buffer insertion logic may process the packet through a hashing function. Buffer insertion logic may then compare the results of the hashing function from a received packet with the results of the hashing function from the packets stored in the buffer to determine if a more detailed or lengthy comparison is warranted. If a more detailed comparison is warranted, buffer insertion logic may compare all or a portion of the received packet and one or more packets in the buffer to determine if the received packet is a duplicate.

In an embodiment, the hashing function may be a cyclic redundancy check (CRC) function. In another embodiment, the buffer insertion logic may compare a checksum value in the packets to determine if further comparison is warranted.

The size of the buffer may be determined by a variety of factors. For example, the size of the buffer may be based on the number of ports of switch 110 that are being mirrored to computer system 103. In another example, the size of the buffer may be based on the number of VLANs that are being mirrored to computer system 103. In another example, the size of the buffer may be based on the load traversing VLAN 130, network 120, or switch 110.

FIG. 2 is a flowchart illustrating a method of removing duplicate packets from a packet stream. The steps illustrated in FIG. 2 may be performed by one or more elements of communication system 100.

A first packet, one or more intervening packets, and a second packet are received in that order (202). For example, switch 110 may be configured to mirror packets on VLAN 130 to computer system 103. Computer system 103 may then receive a first packet from switch 110. Computer system 103 may then receive one or more intervening packets from switch 110. Computer system 103 may then receive a second packet from switch 110.

The first packet is inserted into a buffer (204). For example, computer system 103 may insert the first packet into a buffer. The buffer may be a circular buffer. The buffer may be another type of first in first out (FIFO) buffer.

The one or more intervening packets are inserted into the buffer after the first packet (206). For example, computer system 103 may insert one or more packets into the buffer after it inserted the first packet into the buffer.

At least a portion of the first packet is compared to a portion of the second packet (208). For example, computer system 103 may compare a portion of the first packet to a portion of the second packet. In another example, computer system 103 may compare a checksum field of the first packet to the checksum field of the second packet. In an embodiment, computer system 103 may compare a processed version of the first packet to a processed version of the second packet. For example, computer system 103 may compare the result of a hashing function operation on the first packet to the result of the hashing function operation on the second packet.

The second packet is inserted into the buffer after the one or more intervening packets if the second packet is not a duplicate of the first packet (210). For example, computer system 103 may insert the second packet into the buffer after the one or more intervening packets and the first packet if the second packet is not a duplicate of the first packet. Computer system 103 may discard the second packet if the second packet is a duplicate of the first packet. Computer system 103 may discard the second packet if the second packet is a duplicate of the one or more intervening packets.

Figure 3:
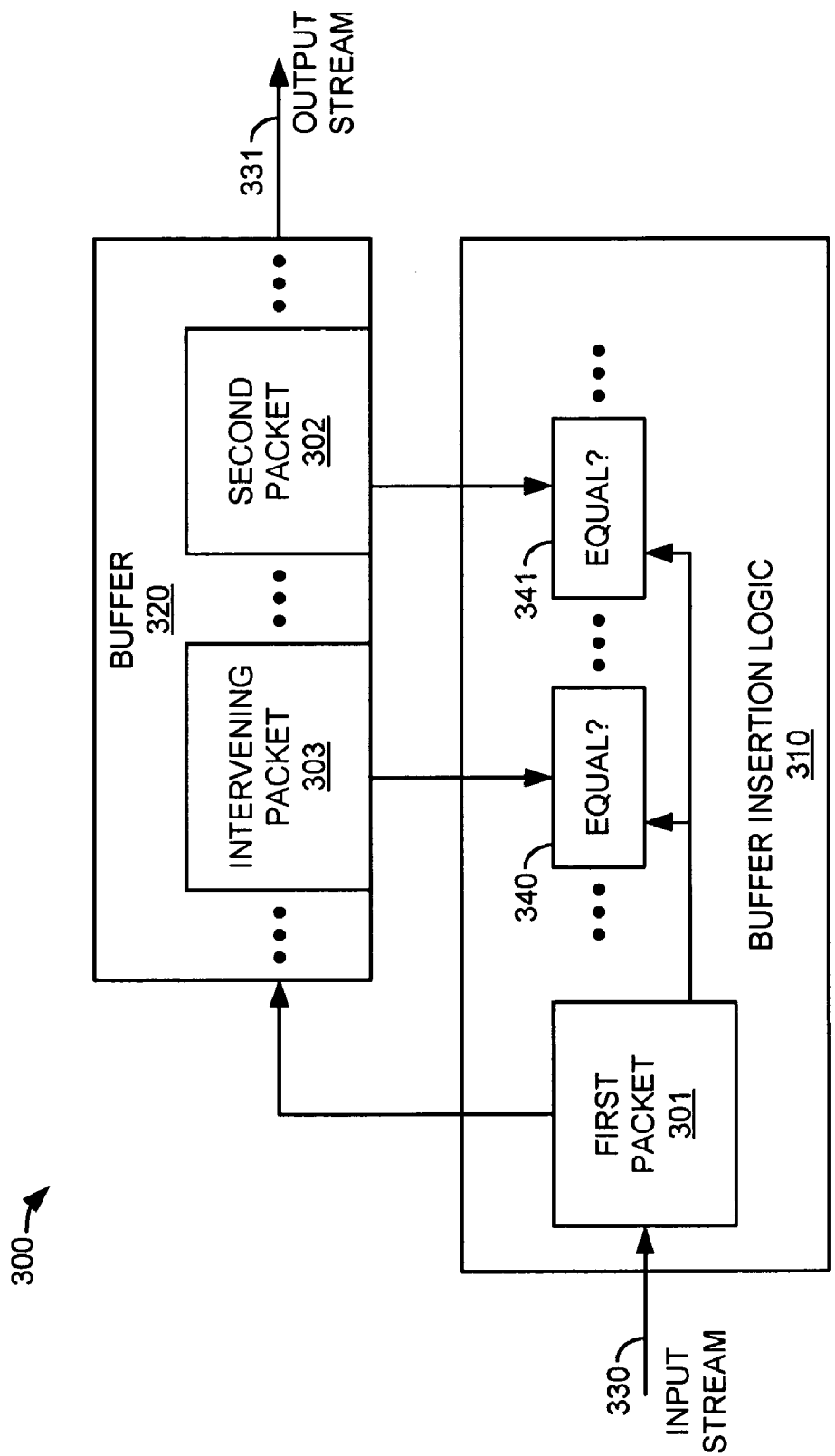
FIG. 3 is a block diagram illustrating a system for removing duplicate packets from a packet stream.

FIG. 3 is a block diagram illustrating a system for removing duplicate packets from a packet stream. In FIG. 3, de-duplication system 300 comprises: buffer insertion logic 310; buffer 320; input stream 330; and output stream 331. Buffer insertion logic 310 receives input stream 330. Buffer insertion logic includes first packet 301, equality check 340, and equality check 341. Buffer 320 produces output stream 331. Buffer 320 contains second packet 302 and intervening packet 303.

Input stream 330 is a stream of traffic, comprised of packets, received by de-duplication system 300. For example, input stream 330 may be a stream of packets received from switch 110 when switch 110 is configured to minor the traffic on VLAN 130. First packet 301, second packet 302, and intervening packet 303 are all packets that were received by de-duplication system 300 via input stream 330.

Intervening packet 303 and second packet 302 have been inserted into buffer 320 by buffer insertion logic 310. Thus, in FIG. 3, intervening packet 303 and second packet 302 are shown contained within buffer 320. Buffer 320 is configured as a first in first out buffer. Buffer 320 may be implemented as a circular buffer. Packets are removed from buffer 320 and sent in output stream 331. Output stream 331 is a stream of traffic comprised of packets received by de-duplication system 300. However, duplicate packets received by de-duplication system 300 that are within the buffer size of buffer 320 have been removed or discarded before these packets are included in output stream 331.

Buffer insertion logic 310 receives a first packet 301 from input stream 301. Buffer insertion logic 310 is configured to compare at least a portion of the first packet to all of the packets in buffer 320. This is illustrated in FIG. 3 by equality check 340 which receives an input from the first packet 301 and the intervening packet 303. This is also illustrated by equality check 341 which receives an input from the first packet 301 and the second packet 302.

Buffer insertion logic 310 receives first packet 301 from input stream 330. Buffer insertion logic 310 uses equality check 340 and equality check 341 to compare at least a portion of the second packet 302 and intervening packet 303 to the first packet 301. If the first packet 301 is not a duplicate of the second packet 302, intervening packet 303, or any other packet in buffer 320, the buffer insertion logic then inserts the first packet 301 into buffer 320.

Buffer insertion logic 310 may process the first packet 301, the second packet 302, or intervening packet 303 as part of determining if the first packet is a duplicate of a packet in buffer 320. For example, buffer insertion logic 310 may process the first packet 301 through a hashing function. Buffer insertion logic 310 may then compare the results of the hashing function operation on the first packet 301 to the results of the hashing function operation on the second packet 302 to determine if a more detailed and lengthy comparison is warranted. If a more detailed comparison is warranted, buffer insertion logic 310 may compare all or a portion of the first packet 301, and the second packet 302, to determine if the first packet 301 is a duplicate of the second packet 302.

In an embodiment, the hashing function used by buffer insertion logic 310 may be a CRC function. In another embodiment, buffer insertion logic 310 may compare a checksum value field in the first packet 301 to a checksum value field in the second packet 302 to determine if further comparison is warranted.

Figure 4:
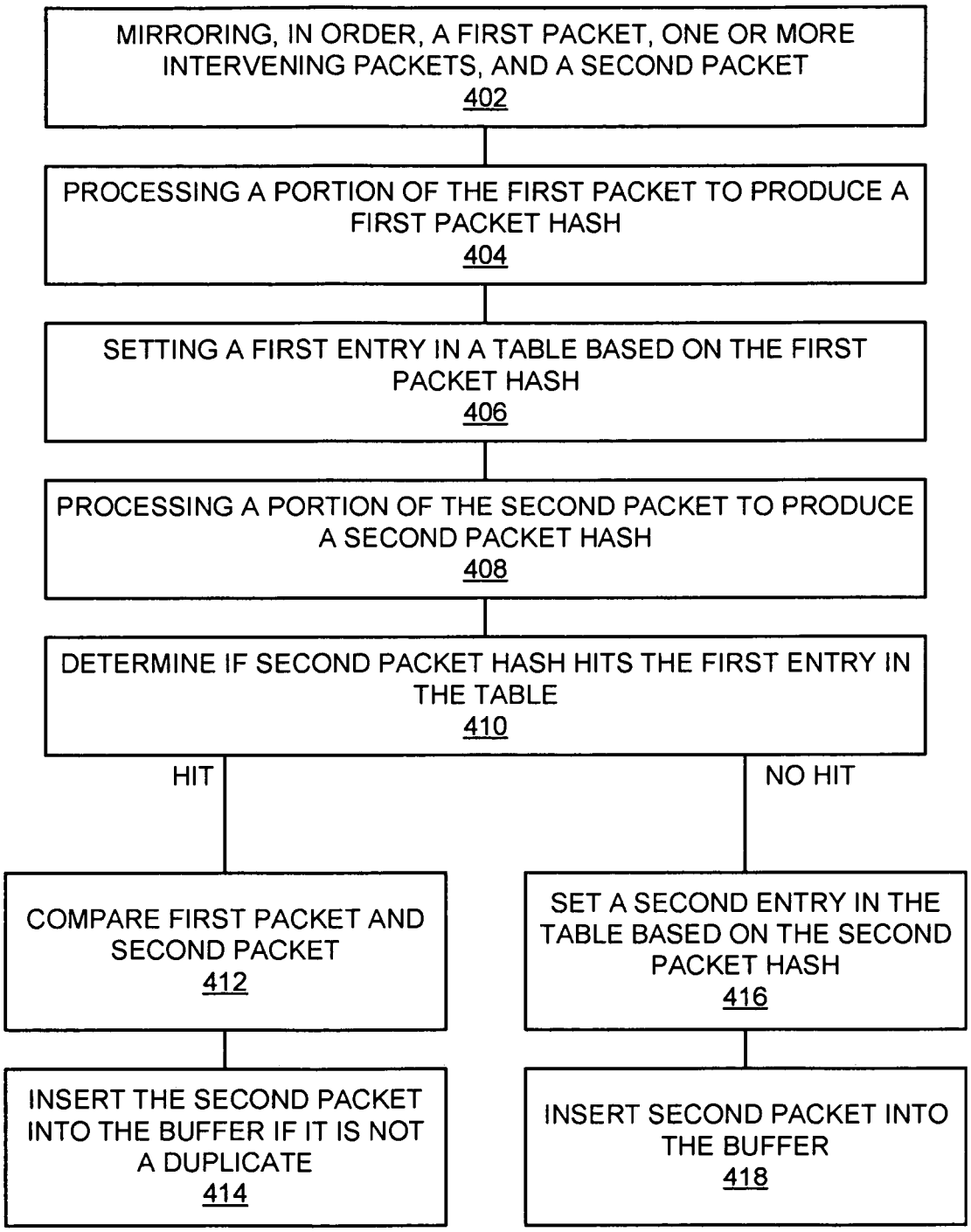
FIG. 4 is a flowchart illustrating a method of operating a communication system to remove duplicate packets from a mirrored packet stream.

FIG. 4 is a flowchart illustrating a method of operating a communication system to remove duplicate packets from a mirrored packet stream. The steps illustrated in FIG. 4 may be performed by communication system 100. Some of the steps illustrated in FIG. 4 may be performed by de-duplication system 300.

A first packet, one or more intervening packets, and a second packet are mirrored in that order (402). For example, switch 110 may minor packets from VLAN 130 to computer system 103. In another example, switch 110 may mirror packets from VLAN 130 to produce an input stream 330 that is received by de-duplication system 300.

At least a portion of the first packet is processed to produce a first packet hash (404). For example, computer system 103 may process a first packet through a hashing function to produce a first packet hash. A first entry in a table is set based on the first packet hash (406). For example, computer system 103 may set an entry in a hash table based on the first packet hash to indicate that a buffer contains an entry that hashes to the first packet hash value. This entry in the table may be unset (i.e., cleared) when the first packet is removed from the buffer to indicate that no packets that correspond to the first packet hash remain in the buffer.

At least a portion of the second packet is processed to produce a second packet hash (408). For example, computer system 103 may process a second packet through the hashing function to produce a second packet hash.

If the second packet hash hits the first entry in the table, flow proceeds to blocks 412 and 414. If the second packet hash does not hit the first entry in the table (or any other entry that has been set), flow proceeds to blocks 416 and 418 (410). For example, computer system 103 may use the second packet hash as an index into the table to determine if the entry corresponding to the second packet hash is set. If the entry is set, then the second packet may be a duplicate packet of the first packet (or another packet already stored in the buffer). If the entry is not set, then computer system 103 may determine that the second packet is not a duplicate packet to the first packet (or any other packet already stored in the buffer.)

If the second packet has hit the entry in the table corresponding to the first packet hash, the first packet and the second packet are compared to determine if they are duplicates (412). For example, computer system 103 may compare at least a portion of the first packet and the second packet to determine if they are duplicates. The table may also contain information that helps computer system 103 find the location of the first packet in the buffer so that it may be compared to the second packet.

If the second packet is not a duplicate, the second packet is inserted into the buffer (414). For example, computer system 103 may insert the second packet into the buffer if computer system 103 determines that the second packet is not a duplicate of the first packet or any other packet in the buffer. If the second packet is a duplicate, it may be discarded. Thus, packets that are duplicates of other packets stored in the buffer are not inserted into the buffer. Because duplicate packets are not stored in the buffer, duplicate packets are not removed from the buffer. This ensures that the packets removed from the buffer are not duplicates of any packets within a distance of each other that is determined by the size of the buffer.

If the second packet hash does not hit the first entry in the table (or any other entry that has been set), a second entry in the table is set based on the second packet hash (416). For example, computer system 103 may set an entry in the hash table based on the second packet hash to indicate that the buffer contains an entry that hashes to the second packet hash value.

The second packet is inserted into the buffer (418). For example, because there was no hit on the first entry (or any other entry in the table), computer system 103 can conclude that the second packet is not a duplicate. Because the second packet is not a duplicate, it may be inserted into the buffer.

The methods, systems, networks, and switches, described above may be implemented with, contain, or be executed by one or more computer systems. The methods described above may also be stored on a computer readable medium. Many of the elements of communication system 100 may be, comprise, or include computers systems. This includes, but is not limited to: computer systems 101-103; switch 110; network 120; buffer insertion logic 310; and, buffer 320.

Figure 5:
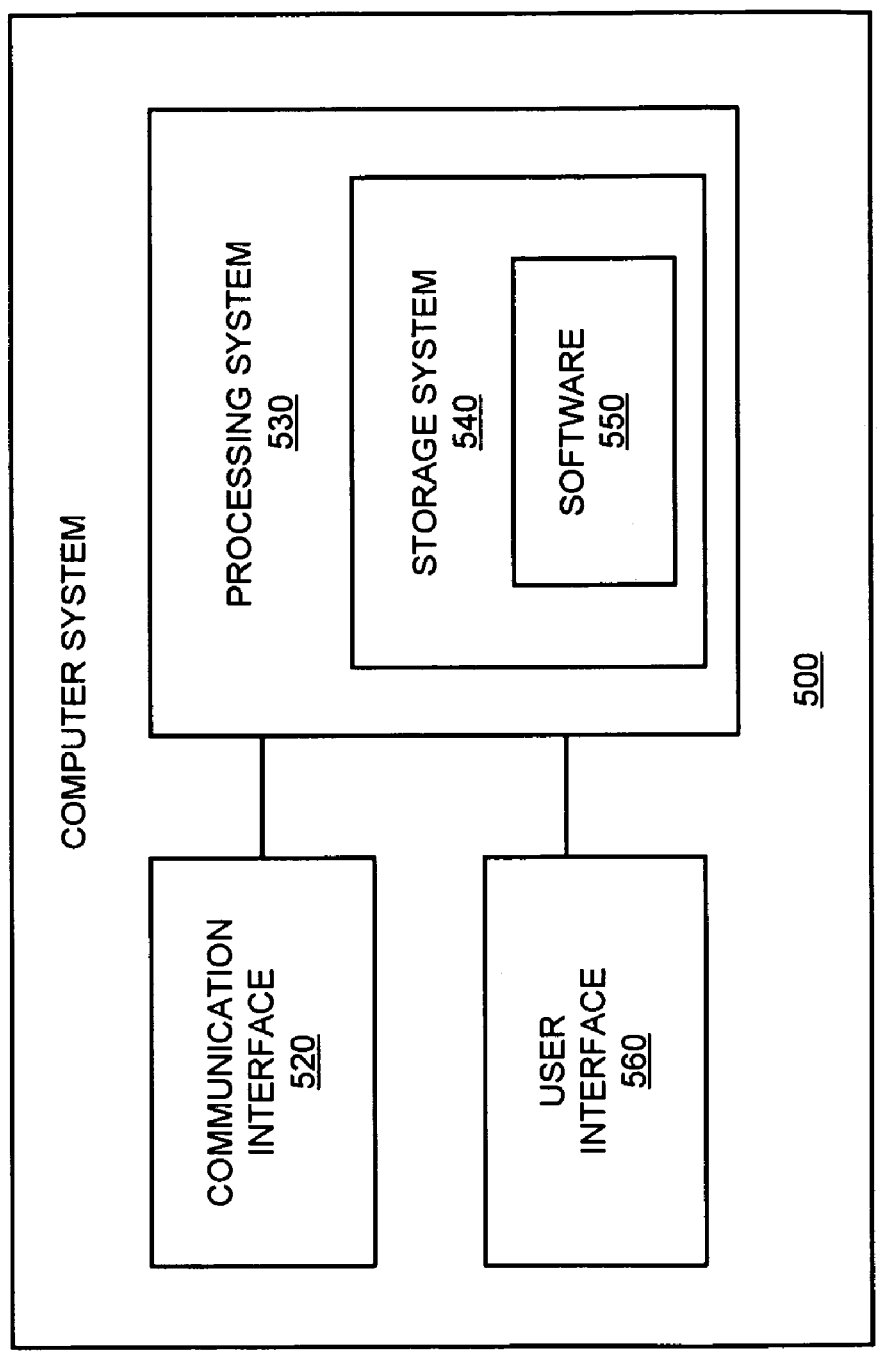
FIG. 5 is a block diagram of a computer system.

FIG. 5 illustrates a block diagram of a computer system. Computer system 500 includes communication interface 520, processing system 530, and user interface 560. Processing system 530 includes storage system 540. Storage system 540 stores software 550. Processing system 530 is linked to communication interface 520 and user interface 560. Computer system 500 could be comprised of a programmed general-purpose computer, although those skilled in the art will appreciate that programmable or special purpose circuitry and equipment may be used. Computer system 500 may be distributed among multiple devices that together comprise elements 520-560.

Communication interface 520 could comprise a network interface, modem, port, transceiver, or some other communication device. Communication interface 520 may be distributed among multiple communication devices. Processing system 530 could comprise a computer microprocessor, logic circuit, or some other processing device. Processing system 530 may be distributed among multiple processing devices. User interface 560 could comprise a keyboard, mouse, voice recognition interface, microphone and speakers, graphical display, touch screen, or some other type of user device. User interface 560 may be distributed among multiple user devices. Storage system 540 could comprise a disk, tape, integrated circuit, server, or some other memory device. Storage system 540 may be distributed among multiple memory devices.

Processing system 530 retrieves and executes software 550 from storage system 540. Software 550 may comprise an operating system, utilities, drivers, networking software, and other software typically loaded onto a computer system. Software 550 could comprise an application program, firmware, or some other form of machine-readable processing instructions. When executed by processing system 530, software 550 directs processing system 530 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method to de-duplicate packets in a packet stream comprising:
determining hash values for the packets and comparing a recent one of the hash values for a recent one of the packets to a list of previous ones of the hash values for previous ones of the packets;
if the recent hash value does not match any of the previous hash values in the list, then loading the recent packet into a FIFO buffer and loading the recent hash value into the list of the previous hash values;

if the recent hash value matches one of the previous hash values in the list, then comparing the recent packet to the previous packet associated with the matching one of the previous hash values;

if the recent packet does not match the previous packet associated with the matching previous hash value, then loading the recent packet into the FIFO buffer and loading the recent hash value into the list of the previous hash values;

if the recent packet matches the previous packet associated with the matching previous hash value, then not loading the recent packet into the FIFO buffer and not loading the recent hash value into the list of the previous hash values;

transferring an oldest one of the previous packets from the FIFO buffer, and in response, removing an oldest one of the hash values for the oldest one of the packets from the list of the previous hash values; and determining a size of the FIFO buffer based on a number of ports being mirrored to a computer system.

2. The method of claim 1 further comprising determining a size of the FIFO buffer based on a number of Virtual Local Area Networks (VLANs) being mirrored to a computer system.

3. The method of claim 1 further comprising determining a size of the FIFO buffer based on a load of a Virtual Local Area Network (VLAN) serving a computer system.

4. A system to remove duplicate packets from a packet stream, comprising:

a processing system configured to determine hash values for the packets and compare a recent one of the hash values for a recent one of the packets to a list of previous ones of the hash values for previous ones of the packets;

if the recent hash value does not match any of the previous hash values in the list, then the processing system is configured to load the recent packet into a FIFO buffer and load the recent hash value into the list of the previous hash values;

if the recent hash value matches one of the previous hash values in the list, then the processing system is configured to compare the recent packet to the previous packet associated with the matching one of the previous hash values;

if the recent packet does not match the previous packet associated with the matching previous hash value, then the processing system is configured to load the recent packet into the FIFO buffer and load the recent hash value into the list of the previous hash values;

if the recent packet matches the previous packet associated with the matching previous hash value, then the processing system is configured to not load the recent packet into the FIFO buffer and not load the recent hash value into the list of the previous hash values; and a communication interface configured to receive the packets and to transfer an oldest one of the previous packets from the FIFO buffer;

in response to transferring the oldest previous packet from the FIFO buffer, the processing system is configured to remove an oldest one of the hash values for the oldest packet from the list of the previous hash values;

wherein a size of the FIFO buffer is determined based on a number of ports being mirrored to a computer system.

5. The system of claim 4 wherein a size of the FIFO buffer is determined based on a number of Virtual Local Area Networks (VLANs) being mirrored to a computer system.

6. The system of claim 4 wherein a size of the FIFO buffer is determined based on a load of a Virtual Local Area Network (VLAN) serving a computer system.

* * * * *